(12) United States Patent
Morimoto

(10) Patent No.: US 8,233,836 B2
(45) Date of Patent: Jul. 31, 2012

(54) DRIVE TRANSMITTING DEVICE, AND IMAGE FORMING APPARATUS PROVIDED WITH THE SAME

(75) Inventor: Kouji Morimoto, Osaka (JP)

(73) Assignee: Kyocera Mita Corporation (JP)

( * ) Notice: Subject to any disclaimer, the term of this patent is extended or adjusted under 35 U.S.C. 154(b) by 943 days.

(21) Appl. No.: 12/178,823

(22) Filed: Jul. 24, 2008

(65) Prior Publication Data

US 2009/0036221 A1 Feb. 5, 2009

(30) Foreign Application Priority Data

Jul. 31, 2007 (JP) ................................. 2007-198984

(51) Int. Cl.
*G03G 15/00* (2006.01)
*F16C 33/02* (2006.01)
(52) U.S. Cl. ......... 399/388; 399/117; 384/276; 384/280
(58) Field of Classification Search .................. 384/244, 384/276, 280, 281, 295; 29/898.07; 399/117, 399/388

See application file for complete search history.

(56) References Cited

U.S. PATENT DOCUMENTS

| | | | |
|---|---|---|---|
| 5,585,911 A * | 12/1996 | Hattori et al. | 399/227 |
| 6,778,796 B2 * | 8/2004 | Maeshima et al. | 399/167 |
| 2006/0257059 A1 * | 11/2006 | Kubota et al. | 384/293 |

FOREIGN PATENT DOCUMENTS

| | | |
|---|---|---|
| JP | 10-196671 | 7/1998 |
| JP | 2005-134670 | 5/2005 |

* cited by examiner

*Primary Examiner* — Judy Nguyen
*Assistant Examiner* — Blake A Tankersley
(74) *Attorney, Agent, or Firm* — Gerald E. Hespos; Michael J. Porco

(57) ABSTRACT

A drive transmitting device includes: a rotational shaft having peripheral surface with a cut-off surface extending along an axial direction of the rotational shaft; a bearing member for supporting the rotational shaft, the bearing member being in slide contact with the peripheral surface of the rotational shaft; and a spacer which is mounted in a clearance formed between an inner circumferential surface portion of the bearing member and the cut-off surface of the rotational shaft.

20 Claims, 8 Drawing Sheets

DRIVE TRANSMITTING DEVICE, AND IMAGE FORMING APPARATUS PROVIDED WITH THE SAME

BACKGROUND OF THE INVENTION

1. Field of the Invention

The present invention relates to a drive transmitting device for transmitting a drive force of a rotational drive member, and an image forming apparatus provided with the same.

2. Description of the Related Art

In image forming apparatuses such as a copying machine, a printer, a facsimile machine, and the like, various rotational members are used. For rotation of the rotational members, it is necessary that a drive force is transmitted from a drive power source such as a driving motor to each of the rotational members. Therefore, a multi-step gear or a timing belt is provided from a gear connected to a drive motor rotating at a high speed for obtaining a great speed reduction ratio, so that the rotational speed is reduced before a drive force is transmitted to the rotational members.

Further, other than a case where a stepping motor or the like is used to control the rotational speed of each rotational member to be reduced with few steps, usually, a gear arrangement is branched from a single drive motor, and an electromagnetic clutch or the like is provided on a rotational shaft or a driving shaft of the rotational member provided at an end, so that a control of switching ON/OFF of the rotation of the rotational member is performed.

As the rotational shaft, generally, a rotational shaft is used which is provided at its one end with a cut-off surface having a D-shaped cross section formed by milling or the like. The cut-off surface on one end of the rotational shaft is engaged with, for example, a flat surface of a D-shaped hole formed in a gear for transmitting a drive force of the electromagnetic clutch, and the other end is engaged with a flat surface of a D-shaped hole formed in the drive input gear of the rotational member, so that a drive force is transmitted from the electromagnetic clutch to the rotational member.

Conventionally, there have been proposed technologies for preventing rattling and wearing which occurs between such rotational shaft and a member to which the rotational shaft is inserted. For example, Japanese Patent Unexamined Publication No. H10-196671 discloses a technology of tightly securing a rotational shaft and a gear (drive-inputting gear) to improve a rotational accuracy of the gear. Here, a slit is formed along an axial direction, and a bush (spacer) having a tapered cylindrical portion is used. An inner circumferential surface of the gear is tapered, and the cylindrical portion of the bush is pressed into a space between the inner circumferential surface of the gear and the outer peripheral surface of the rotational shaft, so that the tight securing is realized. Further, Japanese Patent Unexamined Publication No. 2005-134670 discloses a technology of integrally providing a rotational slide collar (spacer) to opposite ends of a rotational shaft of a conveying stick provided with a rotational wing and made of resin so as to prevent entering of toners into the slide surface with respect to the bearing.

However, according to those conventional technologies, a spacer which covers an outer peripheral surface of a rotational shaft formed to have a cylindrical shape is inserted to a space between an outer peripheral surface of a rotational shaft and an inner circumferential surface of a gear or bearing. In other words, the conventional technologies do not disclose at all about a method for suppressing wearing which occurs between a rotational shaft having a D-shaped cross section and an inner circumferential surface of the bearing.

SUMMARY OF THE INVENTION

An object of the present invention is to suppress wearing which occurs between a rotational shaft having a peripheral surface with a cut-off surface extending along an axial direction and a bearing for supporting the rotational shaft, and to suppress rattling and displacement of a rotational shaft.

A drive transmitting device in accordance with an aspect of the present invention achieving the object includes: a rotational shaft having a peripheral surface with a cut-off surface extending along an axial direction of the rotational shaft; a bearing member for supporting the rotational shaft, the bearing member being in slide contact with the peripheral surface of the rotational shaft; and a spacer which is mounted in a clearance formed between an inner circumferential surface of the bearing member and the cut-off surface of the rotational shaft.

Further, an image forming apparatus in accordance with another aspect of the present invention includes: a rotational member for performing an operation in connection with image forming; a drive power source for generating a drive force for driving the rotation member; and a drive transmitting device for transmitting the drive force generated by the drive power source to the rotational member. The drive transmitting device has the configuration described above.

These and other objects, features and advantages of the present invention will become more apparent upon reading of the following detailed description along with the accompanied drawings.

BRIEF DESCRIPTION OF THE DRAWINGS

FIG. 3A is a perspective view from above. FIG. 3B is a front view from the sheet-feeding rollers.

FIG. 4A is a perspective view of the spacer viewed from a side of a bearing. FIG. 4B is a perspective view from a back side of the spacer shown in FIG. 4A.

FIG. 5A is a perspective view from the sheet-feeding rollers. FIG. 5B is a perspective view from an electromagnetic clutch.

FIG. 6A is a perspective view from above. FIG. 6B is a front view from the electromagnetic clutch.

FIG. 7A is a perspective view from the bearing. FIG. 7B is a perspective view from a back side of the spacer shown in FIG. 7A.

FIG. 9A is a perspective view from above. FIG. 9B is a front view the sheet-feeding rollers.

FIG. 12A shows a perspective view from above. FIG. 12B is a front view from the sheet-feeding rollers.

DETAILED DESCRIPTION OF THE PREFERRED EMBODIMENTS

Figure 1:
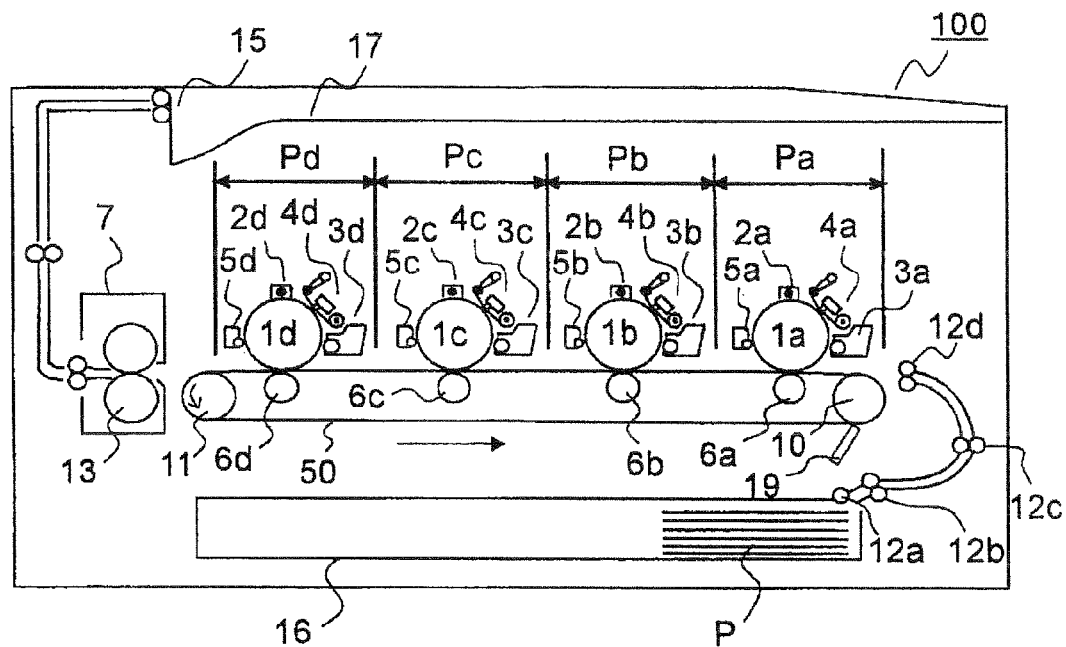
FIG. 1 is a schematic view showing an overall configuration of an image forming apparatus in accordance with an embodiment of the present invention.

FIG. 1 is a schematic view showing an overall configuration of an image forming apparatus 100 in accordance with an embodiment of the present invention. In a main body of the image forming apparatus 100, four image forming sections Pa, Pb, Pc, and Pd are provided sequentially from an upstream side (a right side in FIG. 1) in a conveying direction. The image forming sections Pa-Pd are provided so as to correspond to images of four different colors (magenta, cyan, yellow, and black). Each of the image forming sections Pa, Pb, Pc, and Pd performs steps of charging, exposure, developing, and transferring, so that images of magenta, cyan, yellow, and black are formed sequentially.

The image forming sections Pa-Pd have photoconductive drums 1a, 1b, 1c, and 1d, respectively, for bearing visible images (toner images) of respective colors. While the photoconductive drums 1a-1d are rotated in a clockwise direction in FIG. 1, an image forming processing with respect to the photoconductive drums 1a-1d is performed. The toner images formed on the photoconductive drums 1a-1d are transferred sequentially to a sheet P conveyed by the moving conveyance belt 50 which are moving in adjacent to the image forming sections Pa-Pd while being rotated by a driving mechanism (not illustrated) in a counter-clockwise direction (a direction of an arrow) in FIG. 1. After being subjected to the transfer processing, the sheet P passes through a fixing section 7 to be subjected to a fixing processing of fixing the toner images. After that, the sheet P is discharged from the apparatus main body.

The sheet P to which the toner image is transferred is accommodated in a sheet-supplying cassette 16 in a lower portion of the apparatus. The sheet P is conveyed to the image forming sections Pa-Pd through a sheet-feeding roller 12a, pairs of sheet-feeding rollers 12b and 12c, and a pair of registration rollers 12d. The conveyance belt 50 includes a sheet made of dielectric resin, for example, a belt having end portions which are connected so as to have an endless shape, or a belt having no seam (seamless). Further, on an upstream side of a driven roller 10, there is provided a cleaning blade 19 for removing toners adhered to the conveyance belt 50.

Next, the image forming sections Pa-Pd will be described. Around and above the photoconductive drum 1a-1d which are provided rotatably, there are provided charging devices 2a, 2b, 2c, and 2d for charging the photoconductive drums 1a-1d, LED heads 4a, 4b, 4c, and 4d for performing exposure of image information individually to the photoconductive drums 1a-1d, developing units 3a, 3b, 3c, and 3d for forming toner images on the photoconductive drums 1a-1d, and cleaning sections 5a, 5b, 5c, and 5d for removing toners remaining on the photoconductive drum 1a-1d, respectively.

When an image forming start instruction is inputted by a user, firstly, the charging devices 2a-2d uniformly charge the surfaces of the photoconductive drums 1a-1d, respectively. Then, the LED heads 4a-4d irradiate light, so that electrostatic latent images in accordance with an image signal are formed on the photoconductive drums 1a-1d. The developing units 3a-3d includes developing rollers respectively which are provided so as to oppose to the photoconductive drums 1a-1d. The developing units 3a-3d are filled with predetermined amounts of toners of magenta, cyan, yellow, and black respectively by feeding devices (not illustrated). The toners are supplied to the photoconductive drums 1a-1d by the developing rollers of the developing units 3a-3d, respectively. The toners adhere electrostatically to the electrostatic toner images formed respectively on the surfaces of the photoconductive drums 1a-1d by the light irradiated from the LED heads 4a-4d, so that toner images are formed.

In a state where a predetermined transfer voltage is applied to the transferring rollers 6a-6d, the toner images of magenta, cyan, yellow, and black, which are respectively formed on the photoconductive drum 1a-1d, are transferred to the sheet P which is conveyed by the conveyance belt 50. The images of four colors are formed in a predetermined positional relationship set for a predetermined full-color image forming. After that, for subsequently forming new electrostatic latent images, toners remaining on the surfaces of the photoconductive drums 1a-1d are removed by the cleaning sections 5a-5d.

The conveyance belt 50 is wound around a driven roller 10 and a driving roller 11. When the conveyance belt 50 starts a counter-clockwise rotation concurrently with a rotation of the driving roller 11 driven by a drive motor (not shown), the sheet P is conveyed from the pair of registration rollers 12d to the image forming sections Pa-Pd at a predetermined timing. At the image forming sections Pa-Pd, the images are sequentially transferred to the sheet P at nip portions formed between the transferring rollers 6a-6d and the conveyance belt 50, so that a full-color image is formed. The sheet P to which the toner images are transferred is conveyed to the fixing section 7.

When the sheet P is conveyed to the fixing section 7 and passes through a nip portion of a pair of fixing rollers 13, the sheet P is heated and pressed, so that the full-color image is fixed on the surface of the sheet P. After that, the sheet P is discharged to the sheet-discharging tray 17 by the sheet-discharging rollers 15.

In such image forming apparatus 100, various rotational members are provided. For example, there are provided the sheet-feeding roller 12a, the pairs of sheet-feeding rollers 12b and 12c, the pair of registration rollers 12d, the photoconductive drums 1a-1d, the developing rollers, and the like. For rotating the rotational members, it is necessary that a drive force is transmitted from a drive motor (drive power source) to each of the rotational members.

Figure 2:
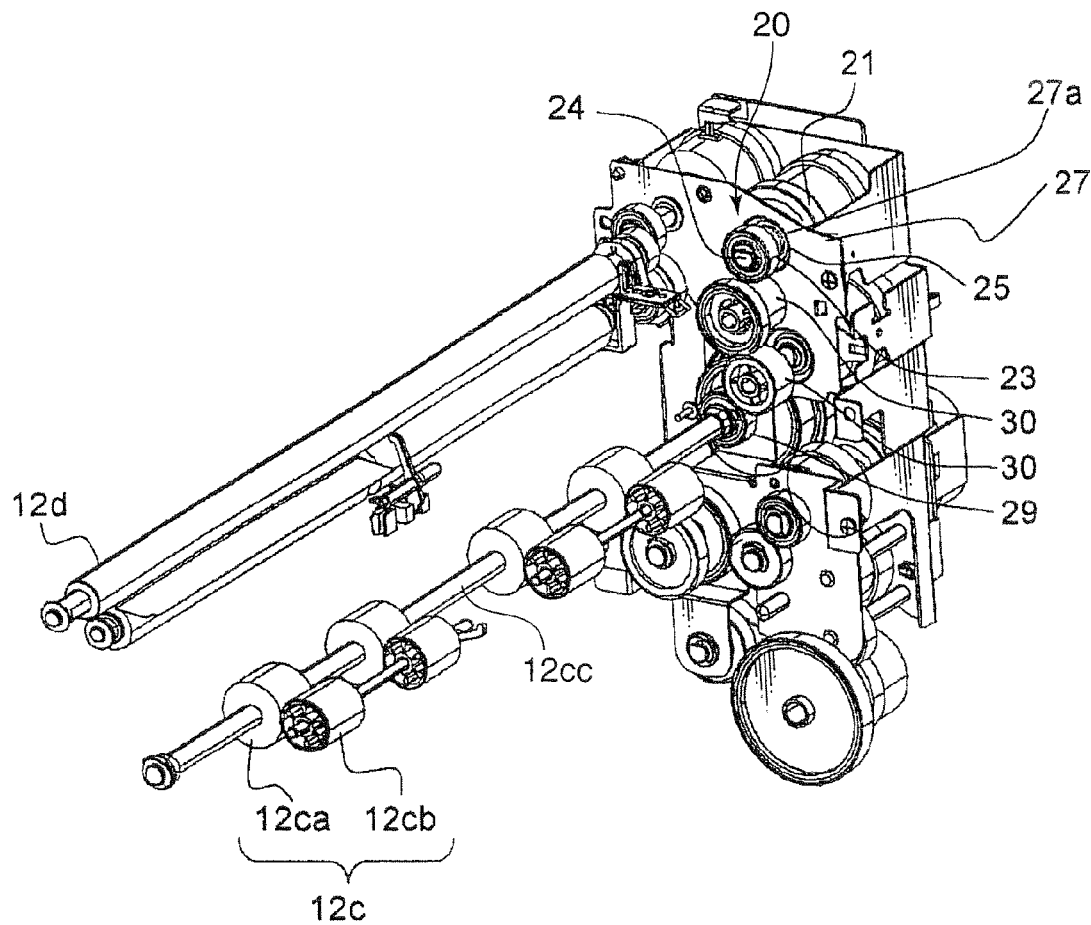
FIG. 2 is a perspective view of sheet-feeding rollers and a driving portion for driving the sheet-feeding rollers, which are provided in the image forming apparatus.
Figure 3A:
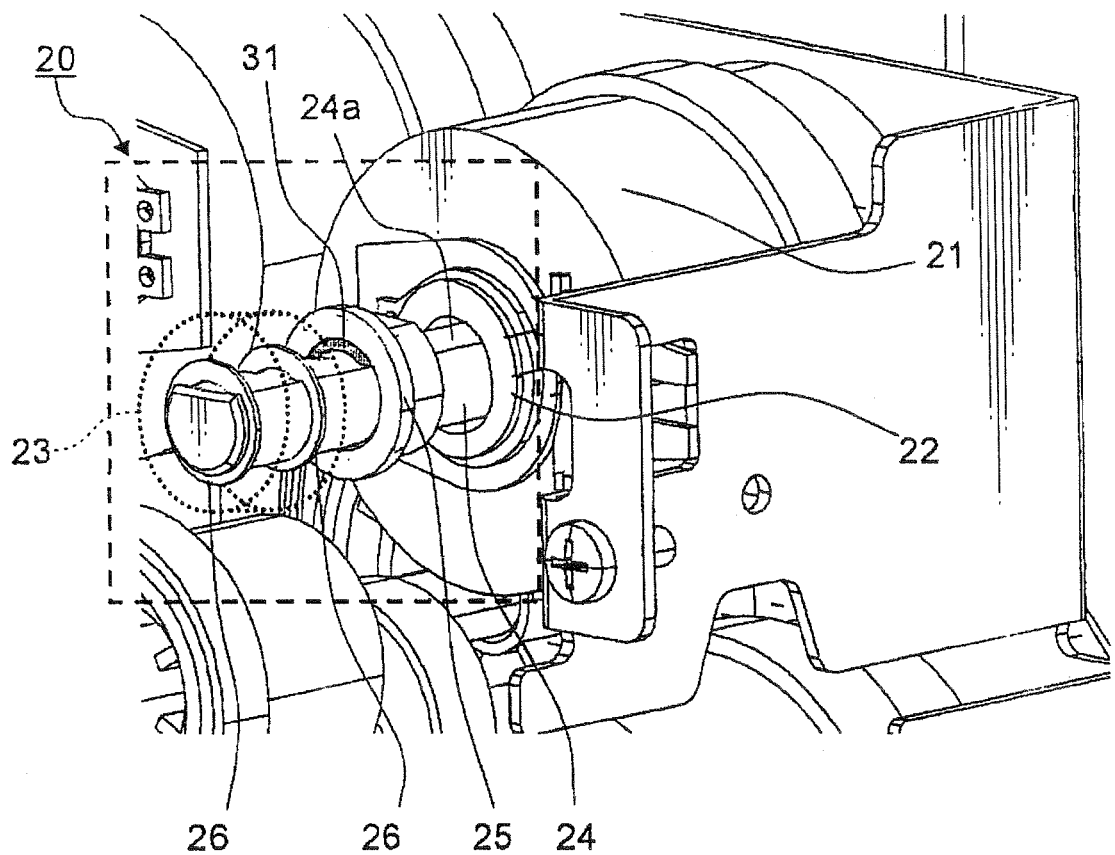
FIGS. 3A and 3B show a drive transmitting device in accordance with a first embodiment.
Figure 3B:
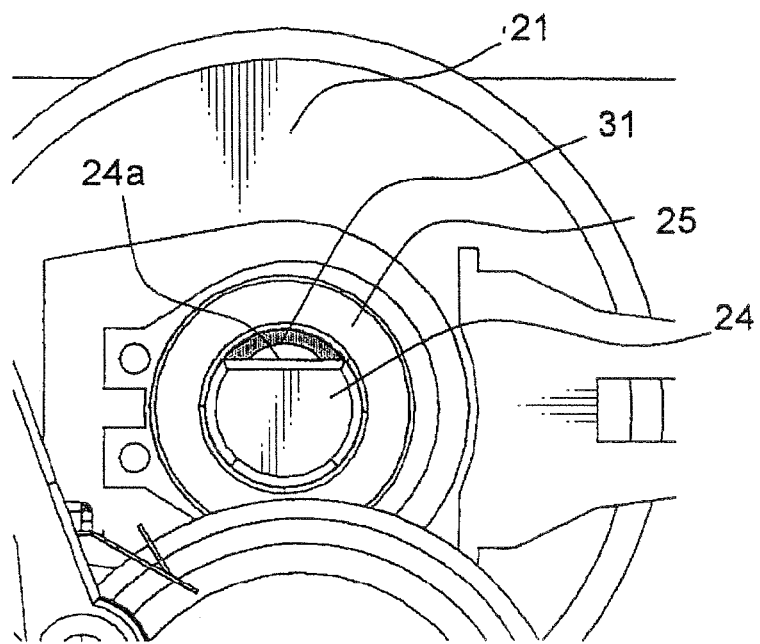

FIG. 2 is a perspective view showing the pairs of sheet-feeding rollers 12c, the pair of registration rollers 12d, and a drive transmitting mechanism. The drive transmitting mechanism includes a drive transmitting device 20 in accordance with an embodiment of the present invention. Further, FIGS. 3A and 3B show the drive transmitting device 20 in accordance with the first embodiment. FIG. 3A is a perspective view from above. FIG. 3B is a front view from the pair of sheet-feeding rollers 12c. In FIG. 3A, for convenience, the drive transmitting device 20 is shown in an area surrounded by broken lines, and a drive transmitting gear 23 is indicated by dot lines.

Each of the pairs of sheet-feeding rollers 12c includes a sheet-feeding roller 12ca and a driven roller 12cb provided so as to opposite to the roller 12ca. In present embodiment, four sheet-feeding rollers 12ca are supported by a rotating shaft 12cc, and four driven rollers 12cb are provided, each of which opposes to the roller 12ca individually. Around one end portion of the rotating shaft 12cc (a right side in the drawing), there are provided an electromagnetic clutch 21, the drive transmitting gear 23 for transmitting a drive force to the sheet-feeding rollers 12ca via the rotating shaft 12cc, a rotational shaft 24, a bearing 25, a drive input gear 29 for exerting a drive force to the rotating shaft 12cc, and two driven gears 30 connecting the drive transmitting gear 23 and the drive input gear 29.

The electromagnetic clutch 21 receives a drive force from a drive motor (not illustrated) and transmits the drive force through a drive transmitting shaft 22 connected to the electromagnetic clutch 21. The sheet-feeding rollers 12ca and the electromagnetic clutch 21 are partitioned by a mounting plate 27. The rotational shaft 24 connected at its one end with the drive transmitting shaft 22 extends through a through hole 27a formed in the mounting plate 27 and is connected at the other end with the drive transmitting gear 23, so that the drive force is exerted to the sheet-feeding rollers 12ca.

As shown in FIGS. 3A and 3B, the drive transmitting device 20 includes the rotational shaft 24, the bearing 25, the drive transmitting shaft 22 (a part of the drive transmitting member), the drive transmitting gear 23 (a part of the drive transmitting member), and the spacer 31 (spacer). One end of the rotational shaft 24 is connected to the drive transmitting shaft 22, and the other end is connected to the drive transmitting gear 23. The bearing 25 is mounted between the drive transmitting shaft 22 of the rotational shaft 24 and the drive transmitting gear 23.

The rotational shaft 24 is a rod-like member with a cut-off surface 24a which is formed by partially cutting off an outer peripheral surface of a cylindrical member to have a D-shaped cross section. In other words, the portion having the cut-off surface 24a in the rotational shaft 24 has a D-shaped cross section taken along a direction perpendicular to an axial direction. The drive transmitting shaft 22 and the drive transmitting gear 23 have engagement holes (not illustrated) respectively to which the ends of the rotational shaft 24 are inserted. Each engagement hole has a flat surface which is engageable with the cut-off surface 24a of the rotational shaft 24.

The opposite end portions of the rotational shaft 24 are inserted respectively to the drive transmitting shaft 22 and the drive transmitting gear 23, so that the rotational shaft 24, the drive transmitting shaft 22, and the drive transmitting gear 23 are connected in such a manner that a drive force can be transmitted. A pin hole may be formed in an end portion of the rotational shaft 24 on a side of the drive transmitting shaft 22, and a spring pin may be provided to the engagement hole of the drive transmitting shaft 22, so that rotational shaft 24 and the drive transmitting shaft 22 is connected by the pin.

In the end portion of the rotational shaft 24 on the side of the sheet-feeding rollers 12ca, two recesses (not illustrated) are formed along a circumferential direction and at different positions in the axial direction. Over the two recesses, stopper rings 26 are fitted. The drive transmitting gear 23 is provided between the two stopper rings 26, and the stopper ring 26 secures the transmitting gear 23 from the front and rear sides in the axial direction.

As described above, by connecting the rotational shaft 24 with the drive transmitting shaft 22 and the drive transmitting gear 23, a drive force transmitted from the electromagnetic clutch 21 is exerted to the sheet-feeding rollers 12ca through the two driven gears 30, the drive input gear 29 and the rotating shaft 12cc. Further, over the rotational shaft 24 and at a position between the drive transmitting shaft 22 and the drive transmitting gear 23, the bearing 25 for supporting the rotational shaft 24 is fitted. The bearing 25 includes a tube-like member having an inner circumferential surface with a circular cross section.

The bearing 25 is provided on the following reasons. In a case where the sheet-feeding rollers 12ca and the electromagnetic clutch 21 are partitioned with the mounting plate 27, and the rotational shaft 24 extends through hole 27a to connect the drive transmitting shaft 22 and the drive transmitting gear 23, it is necessary to form along the axial direction of the rotational shaft 24 the cut-off surface 24a having a length connecting the drive transmitting shaft 22 and the drive transmitting gear 23. In this case, since an axial length of the rotational shaft 24 becomes long, there is a possibility that rattling of the rotational shaft 24 or displacement of the rotational shaft 24 occurs.

The rattling or displacement of the rotational shaft 24 may cause a teeth jumping or the like in a mesh between the drive transmitting gear 23 connected to the rotational shaft 24 and the driven gear 30 connected directly to the drive transmitting gear 23. The teeth jumping causes a delay in timing of conveying a sheet and jamming, and makes it difficult to control a sheet-feeding. Therefore, the bearing 25 is provided to the rotational shaft 24 between the drive transmitting shaft 22 and the drive transmitting gear 23, so as to prevent the defect of the rotational shaft 24. As the bearing 25, for example, a bearing made of an oil-impregnated metal or a bearing including a ball bearing may be used. However, taking in consideration of a cost, it is preferable to use the bearing 25 made of resin.

Figure 12A:
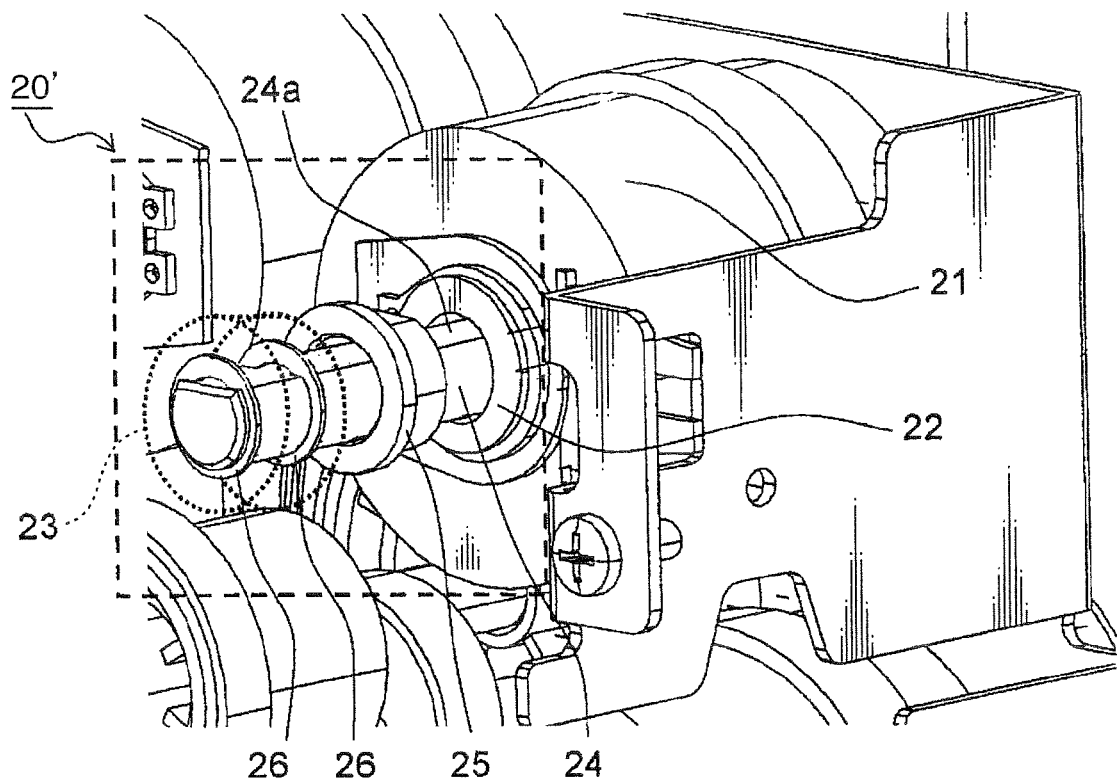
FIGS. 12A and 12B show a drive transmitting device in accordance with a technology compared with the present invention.
Figure 12B:
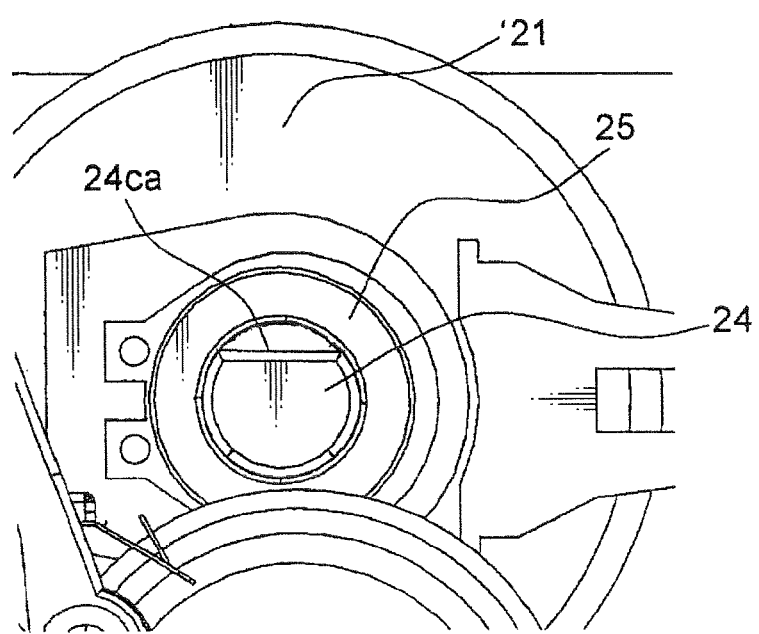

FIGS. 12A and 12B show a drive transmitting device 20' in a state where the bearing 25 is fitted over the rotational shaft 24 (the spacer 31 is not mounted). FIG. 12A is a perspective view from above. FIG. 12B is a front view from the pair of sheet-feeding rollers 12c.

As described above, if the bearing 25 made of resin is used, an inner circumferential surface of the bearing 25 receives a friction from an edge of the cut-off surface 24a due to rotation of the rotational shaft 24, so that it is abraded extremely or broken. Thus, according to the drive transmitting device 20' shown in FIGS. 12A and 12B, rattling or displacement occurs in the rotational shaft 24 due to deterioration of the bearing 25, so that irregular rotation may occur.

Therefore, in the drive transmitting device 20 in accordance with the present embodiment, the spacer 31 is mounted in a clearance between the cut-off surface 24a of the rotational shaft 24 and the inner circumferential surface of the bearing 25. By mounting the spacer 31, abrasion in the inner circumferential surface of the bearing 25 can be suppressed.

Figure 4A:
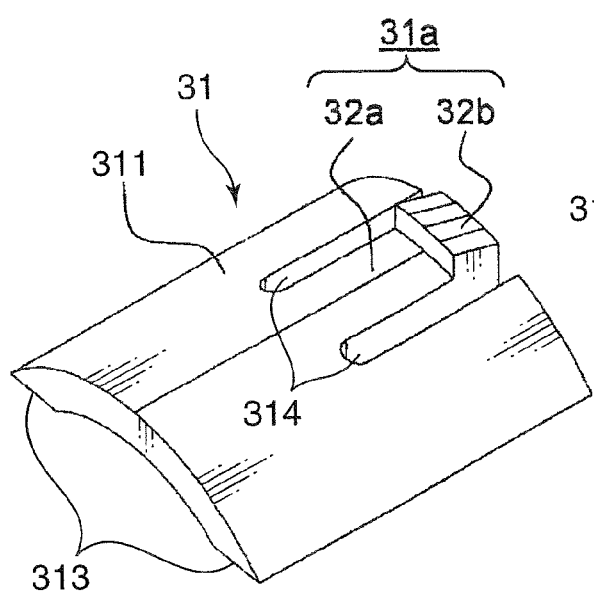
FIGS. 4A and 4B show a spacer in accordance with the first embodiment.
Figure 4B:
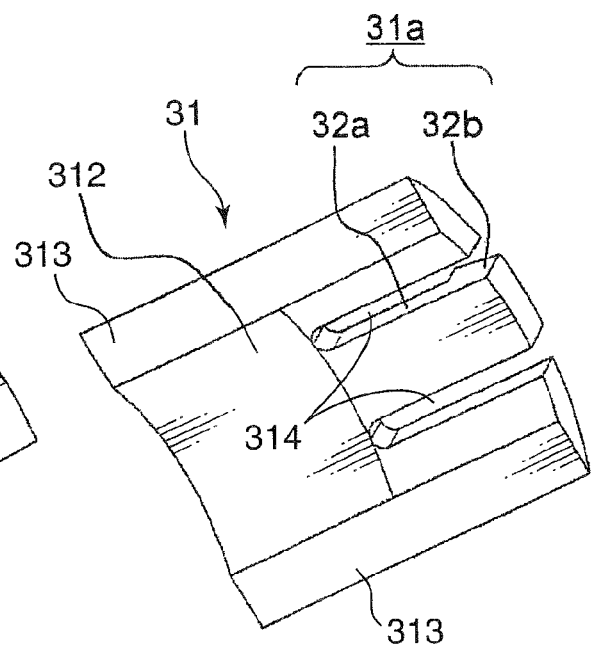
Figure 5A:
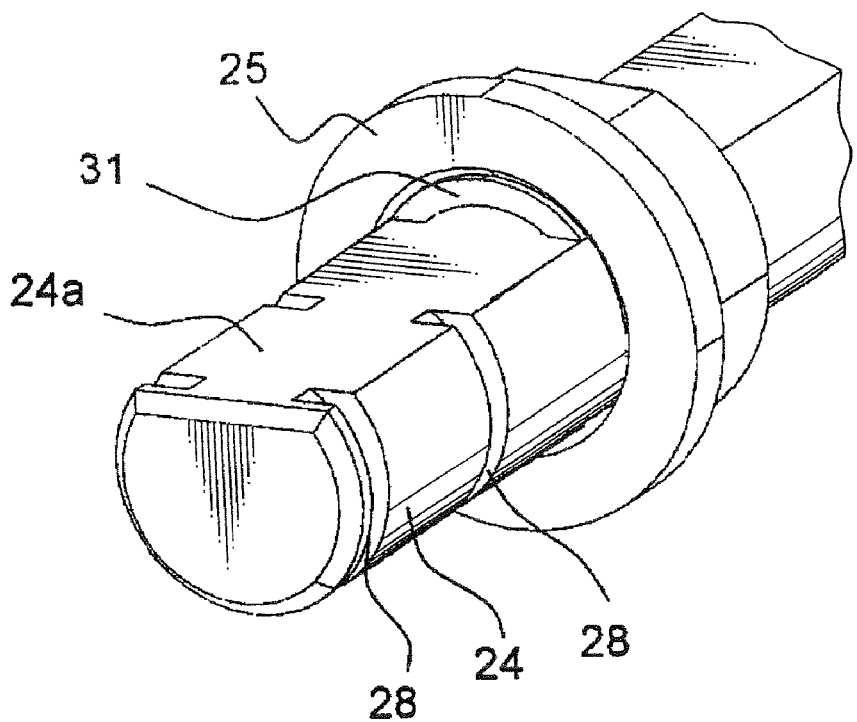
FIGS. 5A and 5B show a state where the spacer is mounted in a clearance between a rotational shaft and the bearing.
Figure 5B:
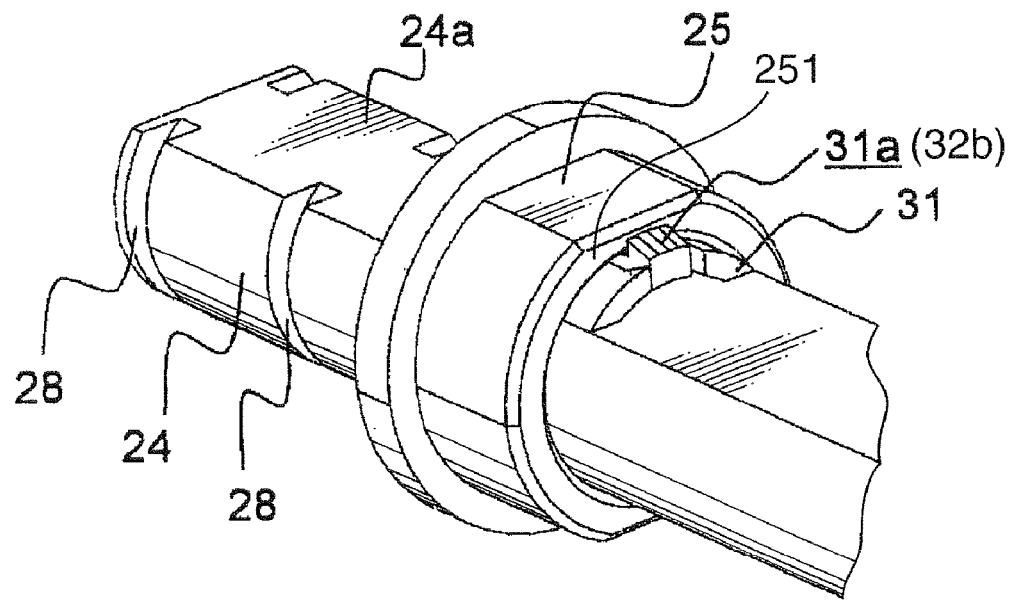

FIG. 4A is a perspective view showing the spacer 31 in accordance with the first embodiment, viewed from the bearing 25. FIG. 4B is a perspective view showing the spacer 31 of FIG. 4A, viewed from a back side. Further, FIG. 5A is a perspective view showing a state where the spacer 31 is mounted in a clearance between the rotational shaft 24 and the bearing 25, viewed from the pair of sheet-feeding rollers 12c. FIG. 5B is a perspective view from the electromagnetic clutch 21. In FIGS. 5A and 5B, for convenience, only the rotational shaft 24, the bearing 25, and the spacer 31 are shown. Further, the portions indicated by the reference numeral 28 in FIGS. 5A and 5B are recesses formed in the rotational shaft 24 at portions where the stopper rings 26 are mounted in FIG. 3A.

The spacer 31 includes a curved piece (circular piece) having an outer peripheral surface 311 with a curved surface extending along a shape of an inner circumferential surface of the bearing 25. A curvature radius of the outer peripheral surface 311 is substantially equal to a curvature radius of the inner circumferential surface of the bearing 25. Further, an inner circumferential surface 312 of the spacer 31 has a curved surface which is coaxial with the outer peripheral surface 311, but the inner circumferential surface 312 has a curvature radius smaller than that of the outer peripheral surface 311. End surfaces 313 which are positioned at opposite ends of the spacer 31 in the circumferential direction are so formed as to be a flat surface.

In a state where the spacer 31 is mounted in the clearance, the outer peripheral surface 311 comes in contact with the inner circumferential surface of the bearing 25, and the end surfaces 313 come in contact with the cut-off surface 24a of the rotational shaft 24. In other words, as being clear from FIGS. 3B and 5A, the spacer 31 fills a lack of surface in the circumferential direction due to the D-shaped cross section of the rotational shaft 24, and a whole area of the inner circumferential surface of the bearing 25 substantially comes in contact with the peripheral surface of the rotational shaft 24 or the outer peripheral surface 311 of the spacer 31.

On one end in the axial direction and at a circumferentially central portion of the spacer 31, a flange portion 31a is formed. The flange portion 31a includes a cutout portion 32a (flexible portion) which is so formed as to extend from an end portion to a central portion of the spacer 31 along an axial direction and is defined by two slits 314 so as to be elongated, and a projecting portion 32b provided on an upper surface of the leading end potion of the cutout portion 32a. An upper end surface of the projecting portion 32b includes a sloping surface which slopes along an axial direction and declines toward a leading end.

As shown in FIGS. 5A and 5B, defining the flange portion 31a as a front end, if the spacer 31 is inserted to the clearance between the rotational shaft 24 and the bearing 25 from a side of the pair of sheet-feeding rollers 12c, the projecting portion 32b comes in contact with the inner circumferential surface of the bearing 25, so that the flange portion 31a is flexibly deformed inwardly along the slope of the projecting portion 32b. Thus, the spacer 31 can be inserted to the clearance described above. Then, if the projecting portion 32b goes out from the end portion 251 of the bearing 25 on the side of the electromagnetic clutch 21, the flexible deformation is released, and the end portion 251 of the bearing 25 comes in contact with the projecting portion 32b, so that the projecting portion 32b engages with the end portion 251. Accordingly, the spacer 31 becomes unlikely to be detached from bearing 25, so that displacement or falling of the spacer 31 can be suppressed, and the rotation of the sheet-feeding rollers 12ca becomes stable.

A material of the spacer 31 may be an engineering plastic, e.g. a polyacetal (POM), and a polyphenyl sulfide (PPS), which is excellent in slidability. Further, although the spacer 31 is inserted in such a manner that the flange portion 31a is positioned on the side of the electromagnetic clutch 21, the spacer 31 may be arranged in such a manner that the flange portion 31a is positioned on the side of the sheet-feeding rollers 12ca.

In the present embodiment, by using the rotational shaft 24 having a D-shaped cross section, an area of the peripheral surface of the rotational shaft 24 can be made larger as compared to, for example, the one having two cut-off surfaces and an oval shape. Therefore, the sliding with respect to the bearing 25 can be made favorable, so that rattling in the rotation and irregular rotation of the rotational shaft 24 can be prevented. Further, since one clearance is defined between the cut-off surface 24a of the rotational shaft 24 and the inner circumferential surface of the bearing 25, the number of the spacer 31 can be reduced, and the spacer 31 can be formed easily, so that a cost reduction can be achieved.

A cross section of the rotational shaft 24 is not limited to the D-shape, and it may have an oval cross section as described above. Other than this, two or more cut-off surfaces 24a of the rotational shaft 24 may be formed at different positions on the peripheral surface along the axial direction. In this case, the spacer 31 may be mounted in accordance with a shape and the number of clearances between the bearing 25 and the cut-off surface 24a.

Figure 6A:
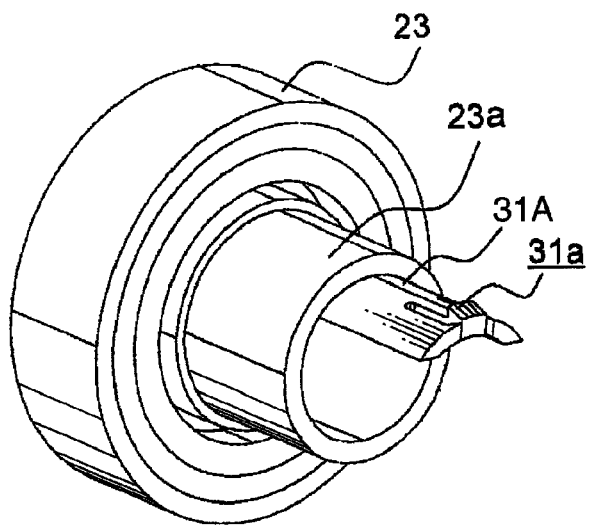
FIGS. 6A and 6B show a spacer in accordance with a second embodiment.
Figure 6B:
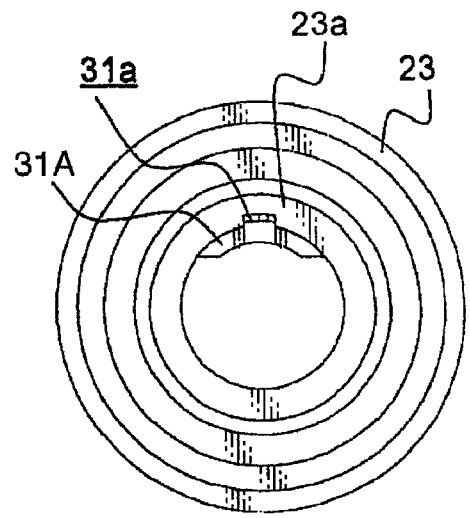

Next, a spacer 31A used in a second embodiment will be described. FIG. 6A is a perspective view of the spacer 31A, viewed from above. FIG. 6B is a front view from the electromagnetic clutch 21. The spacer 31A in accordance with the second embodiment has a shape which is substantially the same as that of the spacer 31 in accordance with the first embodiment, but it is different in that an end portion which is opposite to the side on which the flange portion 31a is formed is fitted and fixed to the inner circumferential surface of a boss 23a formed in a central portion of the drive transmitting gear 23. Further, the stopper rings 26 on the side of the electromagnetic clutch 21, and the recess portions 28 of the rotational shaft 24 to which the stopper rings 26 are provided are not provided.

Since the spacer 31A is integrally provided to the drive transmitting gear 23, the spacer 31A can be mounted concomitantly with the assembling of the drive transmitting gear 23, the rotational shaft 24, and the bearing 25. Firstly, the bearing 25 is mounted to the rotational shaft 24, and the rotational shaft 24 and the drive transmitting gear 23 are connected to each other. Then, the bearing 25 is moved toward the boss 23a of the drive transmitting gear 23, so that the spacer 31A can be fitted to the clearance defined between the bearing 25 and the rotational shaft 24.

According to the second embodiment, an operation of inserting the spacer 31A to the clearance defined between the rotational shaft 24 and the bearing 25 can be omitted. Further, falling or losing of the spacer 31 can be prevented at a time of mounting. Accordingly, the operability further improves. Further, since the stopper rings 26 and the recessed portions 28 are not provided, the number of members can be reduced. The spacer 31 can be fixed to the boss 23a in various methods including known methods, and the methods are not limited. The boss 23a and the spacer 31 may be formed integrally. Furthermore, the spacer 31 is provided to the boss 23 provided in the drive transmitting gear 23. However, the spacer 31 may be provided to a boss provided in the drive transmitting shaft 22.

Figure 7A:
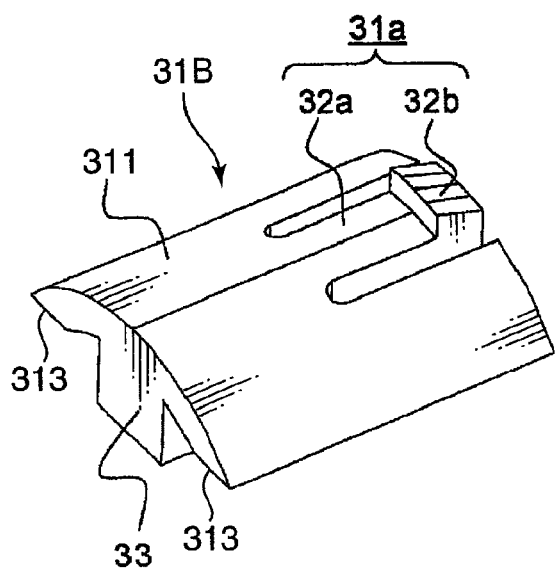
FIGS. 7A and 7B show a spacer in accordance with a third embodiment.
Figure 7B:
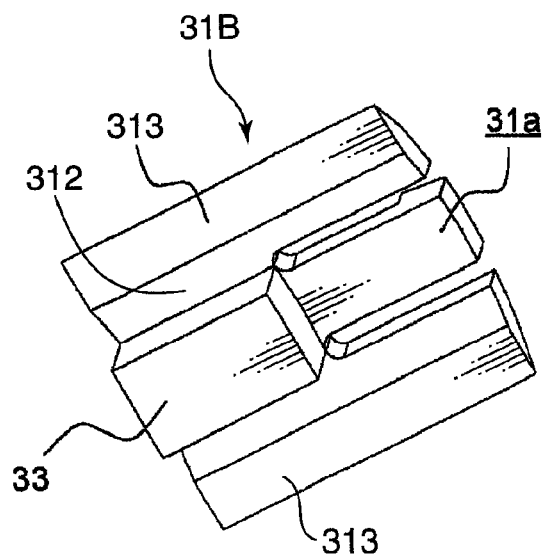
Figure 8:
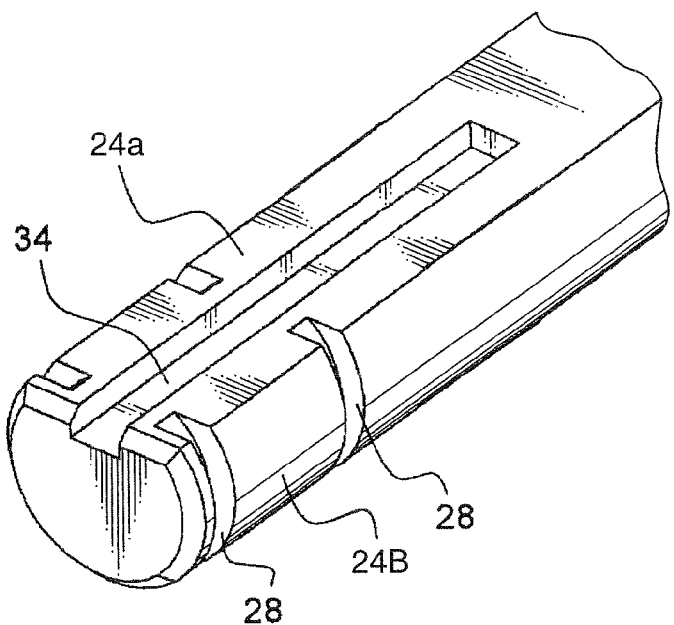
FIG. 8 is a perspective view showing a rotational shaft which is used in the third embodiment.
Figure 9A:
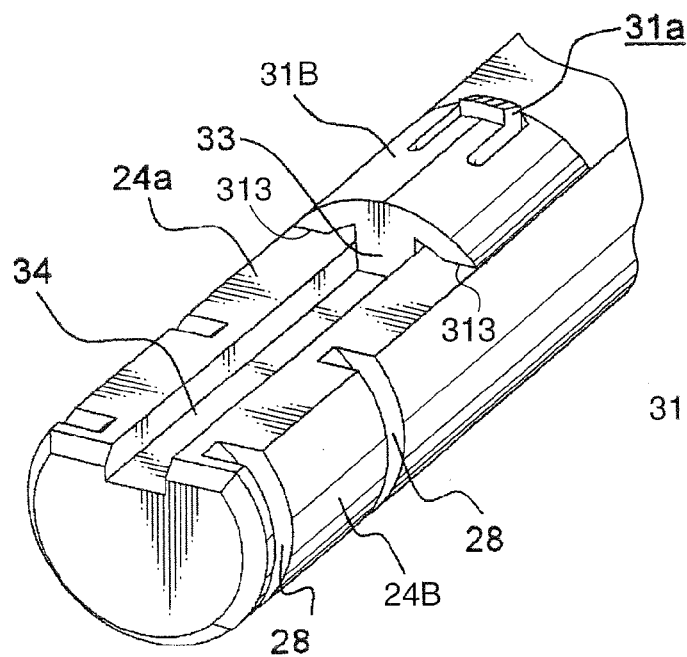
FIGS. 9A and 9B show a state where the spacer and the rotational shaft in accordance with the third embodiment are engaged.
Figure 9B:
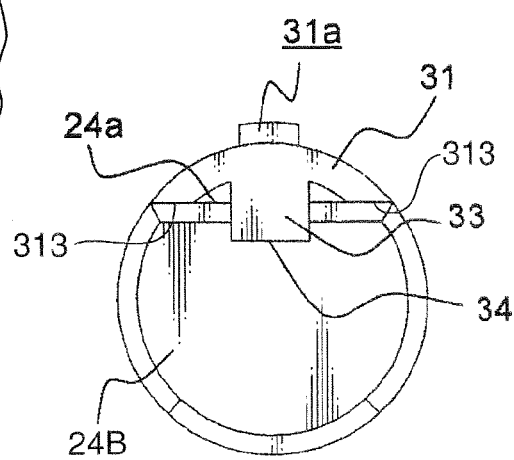

Next, a spacer 31B and a rotational shaft 24B in accordance with a third embodiment will be described. FIG. 7A is a perspective view of the spacer 31B, viewed from the bearing 25. FIG. 7B is a perspective view from a back side of the spacer 31B shown in FIG. 7A. FIG. 8 is a perspective view of a rotational shaft 24A used in the third embodiment. Further, FIG. 9A is a perspective view from above and shows a state where the spacer 31B and the rotational shaft 24B are engaged. FIG. 9B is a front view from the pair of sheet-feeding rollers 12c.

In the third embodiment, an engaging structure will be described specifically in which an engaging structure of engaging the spacer 31B with the cut-off surface 24a of the rotational shaft 24B is provided. The engaging structure includes an engaging projecting portion 33 (first engagement projection) projecting from an inner circumferential surface 312 of the spacer 31B, and an engagement groove 34 (first engagement groove) formed in the cut-off surface 24a of the rotational shaft 24B.

The engaging projecting portion 33 is provided at a circumferentially central portion of the inner circumferential surface 312 opposite to the side of the flange portion 31a in the axial direction of the spacer 31B. Further, the engaging projecting portion 33 has a substantially rectangular cross section which is long in the axial direction. A projecting leading end surface of the engaging projecting portion 33 is positioned lower than the end surface 313. The engagement groove 34 is an engagement groove which is engageable with the engaging projecting portion 33 and continuously formed along the axial direction from the end portion on the side of the pair of sheet-feeding rollers 12c to a predetermined position at which the bearing 25 is mounted.

As shown in FIGS. 9A and 9B, the spacer 31B and the rotational shaft 24B are engaged if the engaging projecting portion 33 is engaged with the engagement groove 34, and the bearing 25 can be mounted to those. In this engaged state, the end surface 313 of the spacer 31B and the cut-off surface 24a come in contact with each other. Since other configurations are completely the same as those of the first embodiment, description regarding those will be omitted. According to the third embodiment, the spacer 31B becomes unlikely to fall apart from the clearance between the bearing 25 and the rotational shaft 24B, so that operability can be improved.

Figure 10:
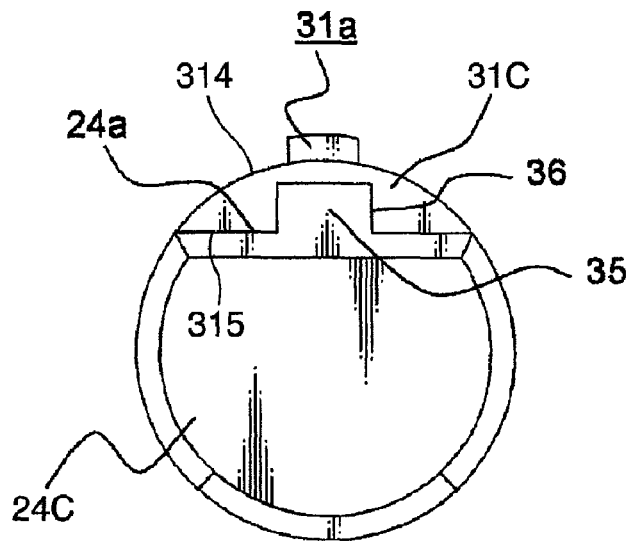
FIG. 10 is a front view of a spacer, a rotational shaft, and a bearing used in a fourth embodiment, viewed from the sheet-feeding rollers.

FIG. 10 is a front view showing a spacer 31C and a rotational shaft 24C in accordance with a fourth embodiment, viewed from the pair of sheet-feeding rollers 12c. The fourth embodiment shows another engaging structure for engaging the spacer 31C and the cut-off surface 24a. The engaging structure includes an engaging projecting portion 35 (second engagement projection) formed on a cut-off surface 24a of a rotational shaft 24C and having a substantially rectangular cross section, and an engagement groove 36 (second engagement groove) formed in the spacer 31C.

The engaging projecting portion 35 is a projection having a rectangular cross section and extending in an axial direction of the rotational shaft 24C. Excluding the portion of the flange portion 31a, the spacer 31C has a crescent shape corresponding to the clearance between an inner circumferential surface of the bearing 25 and the cut-off surface 24a, and the outer peripheral surface 314 on an upper side comes in contact with the inner circumferential surface of the bearing 25, and the lower surface 315 comes in contact with the cut-off surface 24a. The engagement groove 36 is formed in a central portion of the lower surface 315 along the axial direction and being engageable with the engaging projecting portion 35.

As shown in FIG. 10, by the engaging projecting portion 35 with the engagement groove 36, the spacer 31C and the rotational shaft 24C are engaged, and the bearing 25 can be mounted. Since other configurations are completely the same as those of the first embodiment, description of those will be omitted. According to the fourth embodiment, the spacer 31C becomes unlikely to fall apart from the clearance between the bearing 25 and the rotational shaft 24C, so that operability can be improved.

Figure 11:
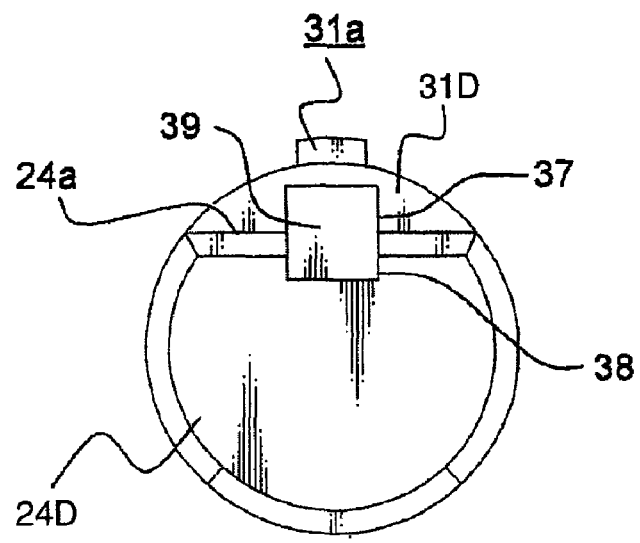
FIG. 11 is a front view of a spacer, a rotational shaft, and a bearing used in a fifth embodiment, viewed from the sheet-feeding rollers.

FIG. 11 is a front view showing a spacer 31D and a rotational shaft 24D in accordance with a fifth embodiment, viewed from the pair of sheet-feeding rollers 12c. The fifth embodiment shows yet another engaging structure for engaging the spacer 31D and the cut-off surface 24a. The engaging structure, similarly to the engagement groove 36 formed in the spacer 31C of the fourth embodiment, includes an engagement groove 37 (third engagement groove) recessing along an axial direction of the spacer 31D, an engagement groove 38 (fourth engagement groove) formed in the cut-off surface 24a of the rotational shaft 24D at a position of opposing to the engagement groove 37, and a key 39 (engaging member) which is engageable with the engagement grooves 37 and 38.

In a state where the spacer 31D is so arranged as to oppose to the cut-off surface 24a, the engagement groove 37 and the engagement groove 38 oppose to each other and define one space having a rectangular shape in a cross section. The key 39 can be inserted to the space. As shown in FIG. 11, the rotational shaft 24D and the spacer 31D are arranged vertically, and the key 39 is inserted to the space, so that the spacer 31D and the rotational shaft 24D are engaged, and the bearing 25 can be mounted to those. Since other configurations are the same as those of the first embodiment, description of those will be omitted. According to the fifth embodiment, the spacer 31D becomes unlikely to fall apart from the clearance between the bearing 25 and the rotational shaft 24D, so that operability can be improved.

The present invention is not limited to the embodiments described above, and various modifications are possible within the scope of the present invention. For example, in the embodiments described above, a drive transmitting device with respect to the sheet-feeding rollers 12ca is described. However, the drive transmitting device according to the present invention is not limited to the rotational member provided in the sheet-supplying unit 12. The present invention may be applied to other drive transmitting device with respect to rotated members such as photoconductive drums 1a-1d, the developing rollers, and the like. Further, in the embodiments described above, the drive transmitting shaft 22 and the drive transmitting gear 23 are used. However, as the drive transmitting member, other members such as pulleys and the like may be used.

Further, in the embodiments described above, the drive transmitting device for transmitting a drive force from the electromagnetic clutch 21 is described. However, the present invention can be applied similarly to devices other than this, for example, a drive transmitting device for transmitting a drive force from a drive motor, and a drive transmitting device connected to a gear and a pulley provided in the rotational shaft 24 and transmitting a drive force from the gear and the pulley to other rotated members.

In the embodiments above, a tandem-type image forming apparatus for a color printing adopting a direct-transfer method is described. However, the present invention may be applied to other image forming apparatus and is not especially limited. For example, the present invention can be applied to a tandem-type image forming apparatus adopting an intermediate-transfer method, a color copying machine, a monochromatic printer and a monochromatic copying machine for a monochromatic printing, and the like. Further, the present invention can be applied to drive transmitting devices adopted in any precision equipment, electronic equipments, and the like, which are other than image forming apparatuses.

The embodiments described above mainly include the invention having the following configurations.

A drive transmitting device in accordance with an aspect of the present invention includes: a rotational shaft having peripheral surface with a cut-off surface extending along an axial direction of the rotational shaft; a bearing member for supporting the rotational shaft, the bearing member being in slide contact with the peripheral surface of the rotational shaft; and a spacer which is mounted in a clearance formed between an inner circumferential surface of the bearing member and the cut-off surface of the rotational shaft.

According to this configuration, when a drive force is transmitted from a drive power source, abrasion which occurs in the inner circumferential surface of the bearing member due to a friction with the rotational shaft can be suppressed by mounting the spacer. Thus, the rattling and displacement in the rotational shaft can be suppressed, so that the irregular rotation can be prevented from occurring. Accordingly, a transmission of a drive force can be performed stably, so that the rotation of the rotated member can be stabilized.

In the configuration above, it is preferable that the rotational shaft has a D-shaped cross-section taken along a direction perpendicular to the axial direction at a portion having the cut-off surface.

According to this configuration, an area of the peripheral surface of the rotational shaft can be made larger. Accordingly, sliding with respect to the bearing is improved, so that the rattling and irregular rotation of the rotational shaft can be prevented from occurring. Further, since the clearance between the cut-off surface of the rotational shaft and the inner circumferential surface of the bearing member becomes one, the number of spacers can be reduced, so that the spacer can be formed easily, and the cost can be reduced.

In the configuration above, it is preferable that the drive transmitting device further includes: a flange portion provided on at least one end of the spacer in the axial direction and being engageable with one end of the bearing member in the axial direction. According to this configuration, displacement and falling of the spacer can be further suppressed, so that the rotational shaft can be rotated in a stable manner.

In this case, it is preferable that the spacer includes a curved piece having a curved surface along a shape of the inner circumferential surface portion of the bearing member, and the flange portion includes: a flexible portion defined by two slits formed in the spacer along an axial direction; and a projecting portion provided at a leading end of the flexible portion. According to this configuration, since the flexible portion is deformed, mountability of the spacer can be improved.

In the configuration above, it is preferable that the drive transmitting device further includes: a drive transmitting member connected to the rotational shaft, and the spacer is fixed to the drive transmitting member. According to this configuration, the spacer can be inserted to the clearance in an easier manner. Further, falling of the space from the clearance can be prevented, so that operability can be improved. Further, the number of members can be reduced.

In the configuration above, it is preferable that the drive transmitting device further includes: an engaging structure for engaging the spacer with respect to the cut-off surface. According to this configuration, the spacer can be prevented from falling out.

In this case, it is preferable that the engaging structure includes: a first engagement projection provided in the spacer on a side facing the cut-off surface and extending along the axial direction of the rotational shaft; and a first engagement groove provided in the cut-off surface and being engageable with the first engagement projection. According to this configuration, the first engagement projection engages with the first engagement groove, so that the spacer becomes unlikely to fall apart from the clearance, thereby improving the operability.

In this case, it is preferable that the drive transmitting device further comprises a flange portion provided on at least one end of the spacer in the axial direction and being engageable with one end of the bearing member in the axial direction, and the spacer includes a curved piece having a curved surface along a shape of the inner circumferential surface portion of the bearing member, and the flange portion includes: a flexible portion defined by two slits formed in the spacer along an axial direction; and a projecting portion provided at a leading end of the flexible portion, and the first engagement projection is provided so as to project from a back side of the curved piece. According to this configuration, the mountability of the spacer becomes more favorable, and the spacer can be prevented from falling apart.

Further, it is preferable that the engaging structure includes: a second engagement projection provided on the cut-off surface and extending along the axial direction of the rotational shaft, and a second engagement groove provided in the spacer on a side facing the cut-off surface and being engageable with the second engagement projection. According to this configuration, the second engagement projection engages with the second engagement groove, so that the spacer becomes unlikely to fall apart from the clearance, and operability can be improved.

Further, it is preferable that the engaging structure includes: a third engagement groove provided in the spacer on a side facing the cut-off surface and extending in the axial direction of the rotational shaft; a fourth engagement groove provided in the cut-off surface so as to face the third engagement groove; and an engaging member engaged with the third engagement groove and the fourth engagement groove. According to this configuration, the engaging member is inserted to the space defined by two engagement grooves, and the spacer and the rotational shaft are engaged. Accordingly, the spacer becomes unlikely to fall apart from the clearance, so that the operability can be improved.

An image forming apparatus in accordance with another aspect of the present invention includes: a rotational member for performing an operation in connection with image forming; a drive power source for generating a drive force for driving the rotation member; and a drive transmitting device for transmitting the drive force of the drive power source to the rotational member, and the drive transmitting device includes: a rotational shaft whose peripheral surface having a cut-off surface extending along an axial direction; a bearing member for supporting the rotational shaft, the bearing member being in slide contact with the peripheral surface of the rotational shaft; and a spacer which is mounted in a clearance formed between an inner circumferential surface portion of the bearing member and the cut-off surface of the rotational shaft.

According to this configuration, rattling and axis misalignment of the rotational shaft which transmits a drive force to the rotational member can be suppressed, so that irregularity in rotation can be prevented from occurring. Therefore, a stable drive transmission can be performed, and the rotation of the rotational member can be stabled, so that a stable image forming can be performed.

It is preferable that the rotational member is at least one of a sheet feeding roller, a photoconductive drum, and a developing roller.

This application is based on Japanese Patent application serial No. 2007-198984 filed in Japan Patent Office on Jul. 31, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus, comprising:
   a rotational member for performing an operation in connection with image forming;
   a drive power source for generating a drive force for driving the rotational member; and
   a drive transmitting device for transmitting the drive force of the drive power source to the rotational member, wherein the drive transmitting device includes:
a rotational shaft whose peripheral surface having a cut-off surface extending along an axial direction, the cut-off surface defining a region of the rotational shaft having a lack of an outer circumferential surface;
a bearing member for supporting the rotational shaft, the bearing member having an inner circumferential surface portion in slide contact with the peripheral surface of the rotational shaft and facing the cut-off surface of the rotational shaft over the entire length of the bearing member in the axial direction of the rotational shaft; and
a spacer mounted in a clearance formed between the inner circumferential surface portion of the bearing member and the cut-off surface of the rotational shaft, the spacer having a surface filling the lack of an outer circumferential surface of the rotational shaft so that the spacer defines part of a substantially continuous outer circumferential surface facing the inner circumferential surface portion of the bearing member over substantially the entire length of the bearing member.

2. The image forming apparatus according to claim 1, wherein the rotational member is at least one of a sheet feeding roller, a photoconductive drum, and a developing roller.

3. The image forming apparatus according to claim 1, wherein the inner circumferential surface portion of the bearing member is in slide contact with the spacer.

4. The image forming apparatus according to claim 1, wherein the spacer has at least one flat surface in contact with the cut-off surface of the rotational shaft and a curved surface opposite the flat surface and engaged with an inner circumferential surface of the bearing member.

5. The image forming apparatus according to claim 4, wherein the spacer has an axial length parallel to the rotational shaft that is at least equal to an axial length of the bearing parallel to the rotational shaft.

6. The image forming apparatus according to claim 1, wherein the bearing member has a substantially cylindrical inner circumferential surface, the spacer being inward of the substantially cylindrical inner circumferential surface of the bearing member.

7. A drive transmitting device, comprising:
a rotational shaft having peripheral surface with a cut-off surface extending along an axial direction of the rotational shaft, the cut-off surface defining a region of the rotational shaft having a lack of an outer circumferential surface;
a bearing member for supporting the rotational shaft, the bearing member having an inner circumferential surface portion in slide contact with the peripheral surface of the rotational shaft and facing the cut-off surface of the rotational shaft over the entire length of the bearing member in the axial direction of the rotational shaft; and
a spacer mounted in a clearance formed between the inner circumferential surface portion of the bearing member and the cut-off surface of the rotational shaft, the spacer having a surface filling the lack of an outer circumferential surface of the rotational shaft so that the spacer defines part of a substantially continuous outer circumferential surface facing the inner circumferential surface portion of the bearing member over substantially the entire length of the bearing member.

8. The drive transmitting device according to claim 7, wherein the rotational shaft has a D-shaped cross-section taken along a direction perpendicular to the axial direction at a portion having the cut-off surface.

9. The drive transmitting device according to claim 7, further comprising:
a flange portion provided on at least one end of the spacer in the axial direction and being engageable with one end of the bearing member in the axial direction.

10. The drive transmitting device according to claim 9, wherein:
the spacer includes a curved piece having a curved surface along a shape of the inner circumferential surface portion of the bearing member, and
the flange portion includes:
a flexible portion defined by two slits formed in the spacer along an axial direction; and
a projecting portion provided at a leading end of the flexible portion.

11. The drive transmitting device according to claim 7, further comprising:
a drive transmitting member connected to the rotational shaft, wherein
the spacer is fixed to the drive transmitting member.

12. The drive transmitting device according to claim 7, further comprising: an engaging structure for engaging the spacer with respect to the cut-off surface.

13. The drive transmitting device according to claim 12, wherein the engaging structure includes:
an engagement projection provided in the spacer on a side facing the cut-off surface and extending along the axial direction of the rotational shaft; and
an engagement groove provided in the cut-off surface and being engageable with the engagement projection.

14. The drive transmitting device according to claim 13, further comprising:
a flange portion provided on at least one end of the spacer in the axial direction and being engageable with one end of the bearing member in the axial direction, wherein:
the spacer includes a curved piece having a curved surface along a shape of the inner circumferential surface portion of the bearing member, and
the flange portion includes:
a flexible portion defined by two slits formed in the spacer along an axial direction; and
a projecting portion provided at a leading end of the flexible portion, and
the first engagement projection is provided so as to project from a back side of the curved piece.

15. The drive transmitting device according to claim 12, wherein
the engaging structure includes:
an engagement projection provided on the cut-off surface and extending along the axial direction of the rotational shaft; and
an engagement groove provided in the spacer on a side facing the cut-off surface and being engageable with the engagement projection.

16. The drive transmitting device according to claim 12, wherein:
the engaging structure includes:
an engagement groove provided in the spacer on a side facing the cut-off surface and extending in the axial direction of the rotational shaft:
an engagement groove provided in the cut-off surface so as to face the engagement groove provided in the spacer; and
an engaging member engaged with the engagement groove provided in the spacer and the engagement groove provided in the cut-off surface.

17. The drive transmitting device according to claim 7, wherein the spacer has an axial length parallel to the rotational shaft that is at least equal to an axial length of the bearing member parallel to the rotational shaft.

18. The drive transmitting device according to claim 17, wherein the spacer has at least one flat surface in contact with the cut-off surface of the rotational shaft and a curved surface opposite the flat surface and engaged with an inner circumferential surface of the bearing member.

19. The drive transmitting device according to claim 17, wherein the bearing member has a substantially cylindrical inner circumferential surface, the spacer being inward of the substantially cylindrical inner circumferential surface of the bearing member.

20. A drive transmitting device, comprising:
- a rotational shaft having peripheral surface with a cut-off surface extending along an axial direction of the rotational shaft;
- a bearing member for supporting the rotational shaft, the bearing member being in slide contact with the peripheral surface of the rotational shaft ; and
- a spacer mounted in a clearance formed between an inner circumferential surface portion of the bearing member and the cut-off surface of the rotational shaft, the spacer including a curved piece having a curved surface along a shape of the inner circumferential surface portion of the bearing member; and
- a flange portion provided on at least one end of the spacer in the axial direction and being engageable with one end of the bearing member in the axial direction the flange portion includes:
- a flexible portion defined by two slits formed in the spacer along an axial direction; and
- a projecting portion provided at a leading end of the flexible portion.

\* \* \* \* \*